(12) United States Patent
Horie et al.

(10) Patent No.: US 6,288,796 B1
(45) Date of Patent: Sep. 11, 2001

(54) EQUIPMENT AND METHOD FOR TRANSMITTING FACSIMILE SIGNAL

(75) Inventors: Nobuyoshi Horie; Shigeaki Suzuki, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/155,797

(22) PCT Filed: Feb. 25, 1998

(86) PCT No.: PCT/JP98/00766

§ 371 Date: Oct. 6, 1998

§ 102(e) Date: Oct. 6, 1998

(87) PCT Pub. No.: WO98/38794

PCT Pub. Date: Sep. 3, 1998

(30) Foreign Application Priority Data

Feb. 28, 1997 (JP) .................................................. 9-046746

(51) Int. Cl.[7] ...................................................... H04N 1/32
(52) U.S. Cl. ............................ 358/405; 758/444; 758/434
(58) Field of Search ................................... 358/404, 444, 358/434, 435, 436, 400, 405

(56) References Cited

U.S. PATENT DOCUMENTS

| | | | |
|---|---|---|---|
| 4,554,669 | 11/1985 | Deman et al. | 375/1 |
| 5,159,465 | * 10/1992 | Maemura | 358/405 |
| 5,335,085 | 8/1994 | Nakatsuma | 358/404 |
| 5,426,647 | 6/1995 | Suto et al. | 375/5.1 |
| 5,477,339 | * 12/1995 | Sugawara | 358/406 |
| 5,654,964 | * 8/1997 | Wake | 370/395 |
| 5,822,084 | 10/1998 | Hwang | 358/437 |
| 5,986,684 | * 11/1999 | Ohashi | 347/194 |

FOREIGN PATENT DOCUMENTS

| | | | |
|---|---|---|---|
| 3834450 C2 | * 8/1989 | (DE) | H04N/1/32 |
| 0660579A2 | 6/1995 | (EP) | H04N/1/327 |
| A61-290863 | 12/1986 | (JP) . | |
| A2-81565 | 3/1990 | (JP) . | |
| A5-103001 | 4/1993 | (JP) . | |
| A5-136970 | 6/1993 | (JP) . | |
| A6-178076 | 6/1994 | (JP) . | |
| A7-15412 | 1/1995 | (JP) . | |
| A7-107255 | 4/1995 | (JP) . | |
| 07322025 | * 12/1995 | (JP) | H04N/1/32 |

OTHER PUBLICATIONS

Patent Abstracts of Japan—Abstract only—Publication No. JP03265291—Publication Date—Nov. 26, 1991.
Shyu et al—"Detection and Correction of Transmission Errors in Facsimile Images"—Aug. 1, 1996—XP000624098.

* cited by examiner

Primary Examiner—Jerome Grant, II

(57) ABSTRACT

When a frame detection signal is received which indicates that frame data was discarded during transmission, a facsimile signal corresponding to the oldest one of facsimile signals stored in a restored data storage part 30, 41 is output to a modem 22, 33.

24 Claims, 15 Drawing Sheets

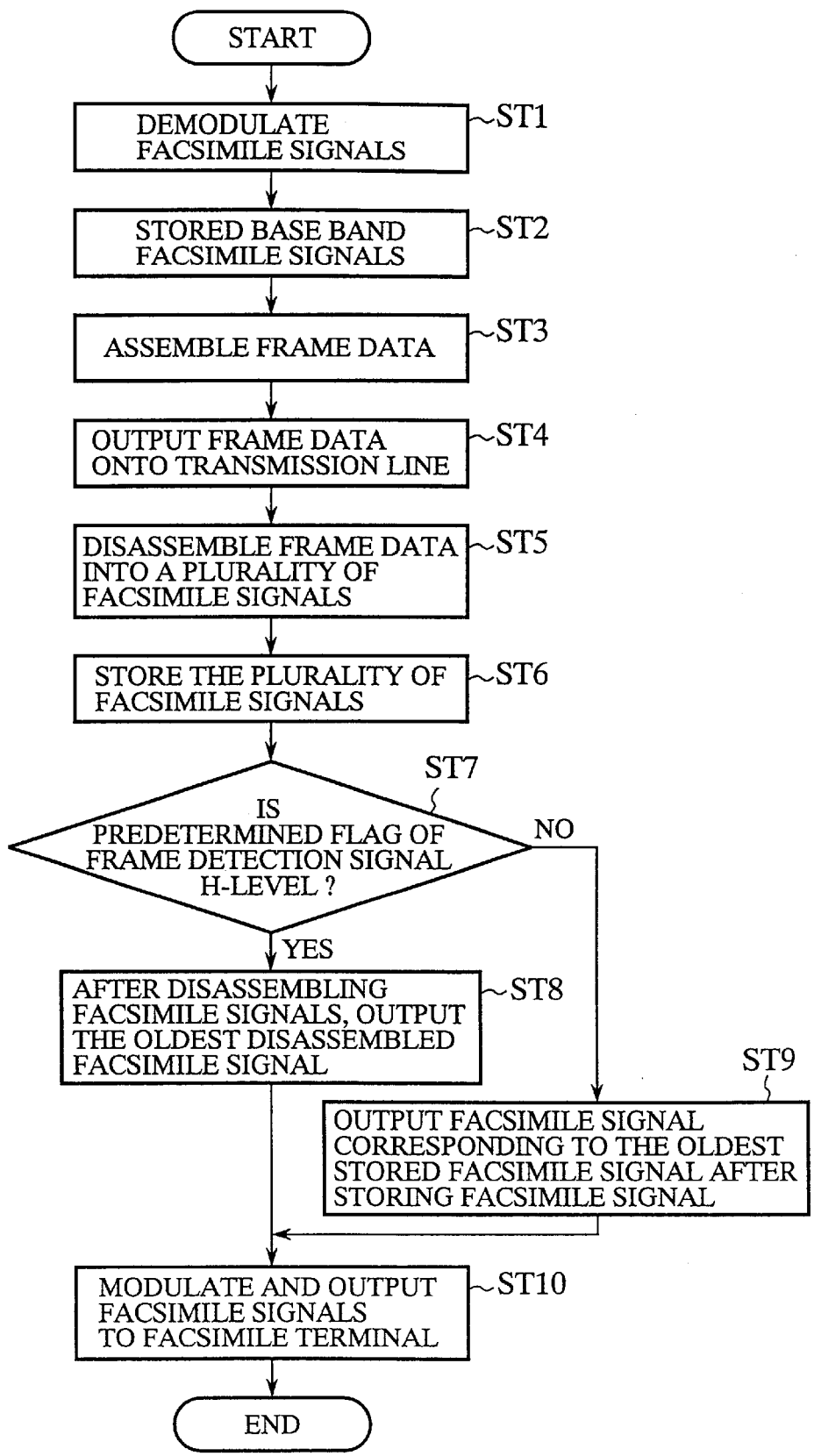

FIG.4

| | | Facsimile signals in the cycle before last | Facsimile signals in the preceding cycle | Current facsimile signals | |
|---|---|---|---|---|---|
| 1 FRAME | HEADER | NTH-MINUS-FOUR DATA | NTH-MINUS-THREE DATA | NTH-MINUS-TWO DATA | NTH-MINUS-TWO FRAME |
| | HEADER | NTH-MINUS-THREE DATA | NTH-MINUS-TWO DATA | NTH-MINUS-ONE DATA | NTH-MINUS-ONE FRAME |
| | HEADER | NTH-MINUS-TWO DATA | NTH-MINUS-ONE DATA | NTH DATA | NTH FRAME |
| | HEADER | NTH-MINUS-ONE DATA | NTH DATA | NTH-PLUS-ONE DATA | NTH-PLUS-ONE FRAME |

EQUIPMENT AND METHOD FOR TRANSMITTING FACSIMILE SIGNAL

This application is the national phase under 35 U.S.C. §371 of prior PCT International Application No. PCT/JP98/00766 which has an International filing date of Feb. 25, 1998 which designated the United States of America, the entire contents of which are hereby incorporated by reference.

TECHNICAL FIELD

The present invention relates to a facsimile signal transmitting device and a facsimile signal transmitting method that provide enhanced efficiency in the transmission of facsimile signals between a plurality of facsimile terminals in an ATM network, packet communication network or the like.

BACKGROUND ART

FIG. 1 is a block diagram depicting a conventional facsimile signal transmitting device. In FIG. 1, reference numeral 1 denotes a facsimile terminal; 2 denotes a modem which demodulates facsimile signals provided from the facsimile terminal 1 and modulates base band facsimile signals transmitted from another facsimile terminal 8; 2a denotes a demodulator of the modem 2; 2b a modulator of the modem 2; 3 denotes a T. 30 communication protocol control part; 4 denotes a modem control part which controls the modem 2 in accordance with a mode setting information provided from the T. 30 communication protocol control part 3 which controls the communication protocol of facsimile signals; 5 denotes a frame assembling part whereby, based on a signal provided from the T. 30 communication protocol control part 3 and indicating the kind-of each facsimile signal, base band facsimile signals demodulated by the modem 2 are sequentially combined into frame data of a predetermined size and from which the frame data is provided onto a transmission line 6; 6 denotes the transmission line; and 7 denotes a frame disassembling part which, when the frame data of a predetermined size is provided onto a transmission line 13, receives and disassembles the frame data into a plurality of base band facsimile signals and applies them to the modem 2.

Reference numeral 8 denotes a facsimile terminal; 9 denotes a modem of the same function as that of the modem 2; 9a denotes a demodulator of the modem 9; 9b denotes a modulator of the modem 9; 10 denotes T. 30 communication protocol control part of the same function as that of the T. 30 communication protocol control part 3; 11 denotes a modem control part of the same function as that of the modem control part 4; 12 a frame assembling part of the same function as that of the frame assembling part 5; 13 denotes the transmission line; and 14 denotes a frame disassembling part of the same function as that of the frame disassembling part 7.

Next, the operation of the conventional facsimile signal transmitting device will be described.

A description will be given, for convenience's sake, of an operation for transmitting facsimile signals from the facsimile terminal 1 to 8.

In the case of transmitting facsimile signals from the facsimile terminal 1 to 8, the facsimile signals provided in modulated form from the facsimile terminal 1 are demodulated by the demodulator 2 of the modem 2 for conversion into base band facsimile signals so as to improve the facsimile signal transmission efficiency.

And, when the base band facsimile signals are output from the demodulator 2a of the modem 2, the frame assembling part 5 sequentially combines the base band signals into frame data of a predetermined size on the basis of a signal from the T. 30 communication protocol control part 3 that indicates the kind of the facsimile signal concerned.

Upon completion of the generation of the frame data of a predetermined size, the frame assembling part outputs the frame data onto the transmission line 6, with which the transmission of the facsimile signals finishes.

When the frame data is provided onto the transmission line 6 as described above, the frame disassembling part 14 responds to a frame detection signal (a signal indicating the data structure of the frame data concerned and the presence or absence of data discarded during transmission) to disassemble the frame data into a plurality of base band facsimile signals, outputting them to the modem 9.

The frame detection signal mentioned herein is a signal that is provided from a frame discard detecting part (not shown) which makes a check to see if frame data from the frame assembling part 5 has been discarded during transmission over the transmission line 6.

When the plurality of base band facsimile signals are output from the frame disassembling part 14, the modulator 9b of the modem 9 sequentially modulates and provides them to the facsimile terminal 8, with which the reception of the facsimile signal finishes.

The facsimile terminal 8 demodulates the modulated facsimile signals received from the modulator 9b of the modem 9 and performs printing or some other process in accordance with the result of demodulation.

No description will be given of the operation for transmitting facsimile signals from the facsimile terminal 8 to 1 because it is the same as in the case of facsimile signal transmission from the facsimile terminal 1 to that 8.

Because of such a configuration as described above, the conventional facsimile signal transmitting device provides for enhanced efficiency in the transmission of facsimile signals. However, when frame data is discarded by reason of congestion of the transmission line 6 or for some other reason, the fact that the frame data has been discarded can be recognized based on the frame detection signal. However the discarded frame data cannot be sent to the facsimile terminal 1 of the receiving side. Therefore when control data necessary for facsimile communication is contained in the discarded frame data, the possibility exists that the facsimile terminal 1 or the like will terminate through a communication failure. When image data is contained in the discarded frame data, the fax image will suffer serious degradation.

The present invention is intended to solve such problems as mentioned above, and has for its object to provide a facsimile signal transmitting device and a facsimile signal transmitting method which prevent the occurrence of a communication disorder at a facsimile terminal and avoids a serious deterioration of fax images.

DISCLOSURE OF THE INVENTION

A facsimile signal transmitting device according to the present invention is adapted so that, upon reception of a frame detection signal indicating that frame data was discarded during transmission, a facsimile signal corresponding to the oldest one of facsimile signals stored in second storage means is sent to the facsimile terminal of the receiving side.

With such a scheme, even if frame data containing control data necessary for facsimile communication is discarded on the transmission line, facsimile signals that ought to be sent to the facsimile signal of the receiving side can be output thereto; this produces an effect of preventing the occurrence of communication disorder at the facsimile terminal of the receiving side.

A facsimile signal transmitting device according to the present invention is adapted so that data-compressed facsimile signals are combined into frame data.

With such a scheme, even if frame data containing image data is discarded on the transmission line, facsimile signals that ought to be sent to the facsimile signal of the receiving side can be output thereto; this produces an effect of preventing a serious deterioration of the fax image at the facsimile terminal of the receiving side.

A facsimile signal transmitting device according to the present invention is adapted so that dummy data is sent to the facsimile terminal of the receiving side when receiving a frame detection signal indicating that facsimile signals were discarded during transmission.

With such a scheme, the facsimile terminal of the receiving side is allowed to continue decoding; this produces an effect of preventing the occurrence of a communication disorder at the facsimile terminal of the receiving side.

A facsimile signal transmitting device according to the present invention is adapted to output fill data as dummy data.

With such a scheme, even if dummy data is decoded at the facsimile terminal of the receiving side, no bad influence will be exerted on communication control at the facsimile terminal of the receiving side.

A facsimile signal transmitting device according to the present invention is adapted to output white line data as dummy data.

With such a scheme, even if dummy data is decoded at the facsimile terminal of the receiving side, no bad influence will be exerted on communication control at the facsimile terminal of the receiving side.

A facsimile signal transmitting device according to the present invention is adapted so that, upon receiving a frame detection signal indicating that facsimile signals were discarded during transmission, previous facsimile signals stored in storage means are sent to the facsimile terminal of the receiving side.

With such a scheme, it is possible to send the facsimile signals of the preceding cycle, as substitutes for the discarded signals, to the facsimile terminal of the receiving side without the necessity for providing storage means of a large storage capacity; this produces an effect that communication disorder at the facsimile terminal of the receiving side can be prevented with a simple configuration.

A facsimile signal transmitting device according to the present invention is adapted so that, upon receiving a frame detection signal indicating that facsimile signals were discarded during transmission, facsimile signals having predetermined line data inserted between their end of line codes are sent to the facsimile terminal of the receiving side.

With such a scheme, even if facsimile signals containing image data are discarded during transmission, predetermined line data is provided, as a substitute for the discarded facsimile signals, to the facsimile terminal of the receiving side; this produces an effect of ensuring reduction of image degradation more than in the case of no data being provided because of the discarding of the facsimile signals.

A facsimile signal transmitting device according to present invention is adapted to insert fill data as predetermined line data.

With such a scheme, even if line data is decoded at the facsimile terminal of the receiving side, no bad influence will be exerted on communication control at the facsimile terminal of the receiving side.

A facsimile signal transmitting device according to the present invention is adapted to insert white line data as predetermined line data.

With such a scheme, even if line data is decoded at the facsimile terminal of the receiving side, no bad influence will be exerted on communication control at the facsimile terminal of the receiving side.

A facsimile signal transmitting device according to the present invention is adapted to insert, as predetermined line data, facsimile signals received by receiving means previously or succeedingly.

With such a scheme, facsimile signals closely related to the discarded signals can be inserted; this produces an effect of ensuring further reduction of image degradation.

A facsimile signal transmitting device according to the present invention is adapted to incorporate facsimile signals, when outputting them onto the transmission line, into a control signal indicating the use of a first-dimensional coding method (MH coding method) as the coding method of the facsimile terminal.

With such a scheme, the influence of the discarded facsimile signals is localized and hence is not exerted on the preceding and succeeding facsimile signals; this produces an effect of ensuring reduction of image deterioration more than in the case of using a second-dimensional coding method.

A facsimile signal transmitting device according to the present invention is adapted to incorporate facsimile signals, when outputting them onto the transmission line, into a control signal indicating the minimum scanning time at the facsimile terminal and to appropriately change the minimum scanning time.

With such a scheme, the number of pieces of data transmitted per line increases, with the result that the influence of the discarded facsimile signals is localized; this produces a further reduction in image degradation.

A facsimile signal transmitting method according to the present invention is adapted so that, upon reception of a frame detection signal indicating that frame data was discarded during transmission, a facsimile signal corresponding to the oldest one of facsimile signals stored in second storage means is sent to the facsimile terminal of the receiving side.

With such a method, even if frame data containing control data necessary for facsimile communication is discarded on the transmission line, facsimile signals that ought to be sent to the facsimile signal of the receiving side can be output thereto; this produces an effect of preventing a communication disorder from occurrence at-the facsimile terminal of the receiving side.

A facsimile signal transmitting method according to the present invention is adapted so that compressed facsimile signals are combined into frame data.

With such a method, even if frame data containing image data is discarded on the transmission line, facsimile signals that ought to be sent to the facsimile signal of the receiving side can be output thereto; this produces an effect of preventing a serious image deterioration at the facsimile terminal of the receiving side.

A facsimile signal transmitting method according to the present invention is adapted so that dummy data is sent to the facsimile terminal of the receiving side when receiving a frame detection signal indicating that facsimile signals were discarded during transmission.

With such a method, the facsimile terminal of the receiving side is allowed to continue decoding; this produces an effect of preventing a communication disorder from being encountered at the facsimile terminal of the receiving side.

A facsimile signal transmitting method according to the present invention is adapted to output fill data as dummy data.

With such a method, even if dummy data is decoded at the facsimile terminal of the receiving side, no bad influence will be exerted on communication control at the facsimile terminal of the receiving side.

A facsimile signal transmitting method according to the present invention is adapted to output white line data as dummy data.

With such a method, even if dummy data is decoded at the facsimile terminal of the receiving side, no bad influence will be exerted on communication control at the facsimile terminal of the receiving side.

A facsimile signal transmitting method according to the present invention is adapted so that, upon receiving a frame detection signal indicating that facsimile signals were discarded during transmission, previous facsimile signals stored in storage means are sent to the facsimile terminal of the receiving side.

With such a method, it is possible to send the previous facsimile signals, as a substitute for the discarded signals, to the facsimile terminal of the receiving side without the necessity for providing large-capacity storage means; this produces an effect that communication disorder at the facsimile terminal of the receiving side can be prevented with a simple configuration.

A facsimile signal transmitting method according to the present invention is adapted so that, upon receiving a frame detection signal indicating that facsimile signals were discarded during transmission, facsimile signals having predetermined line data inserted between their end of line codes are sent to the facsimile terminal of the receiving side.

With such a method, even if facsimile signals containing image data are discarded during transmission, predetermined line data is provided, as a substitute for the discarded facsimile signals, to the facsimile terminal of the receiving side; this produces an effect of ensuring reduction of image degradation more than in the case of no data being provided because of the discarding of the facsimile signals.

A facsimile signal transmitting method according to present invention is adapted to insert fill data as predetermined line data.

With such a method, even if line data is decoded at the facsimile terminal of the receiving side, no bad influence will be exerted on communication control at the facsimile terminal of the receiving side.

A facsimile signal transmitting method according to the present invention is adapted to insert white line data as predetermined line data.

With such a method, even if line data is decoded at the facsimile terminal of the receiving side, no bad influence will be exerted on communication control at the facsimile terminal of the receiving side.

A facsimile signal transmitting method according to the present invention is adapted to insert, as predetermined line data, previous or succeeding facsimile signals received by receiving means.

With such a method, facsimile signals closely related to the discarded signals can be inserted; this produces an effect of further reduction of image degradation.

A facsimile signal transmitting method according to the present invention is adapted to incorporate into a concerned one of facsimile signals, when outputting them onto the transmission line, a control signal indicating the use of a first-dimensional coding scheme (MH coding scheme) at the facsimile terminal.

With such a method, the influence of the discarded facsimile signals is localized and hence is not exerted on the preceding and succeeding facsimile signals; this ensures a further reduction in image degradation than when using a second-dimensional coding scheme (MR coding scheme).

A facsimile signal transmitting method according to the present invention is adapted to incorporate facsimile signals, when outputting them onto the transmission line, into a control signal indicating the minimum scanning time at the facsimile terminal and to appropriately change the minimum scanning time.

With such a method, the number of pieces of data transmitted per line increases, with the result that the influence of the discarded facsimile signals is localized; this produces an effect of ensuring further reduction of image degradation.

BRIEF DESCRIPTION OF THE DRAWINGS

FIG. 3 is a flowchart showing a facsimile signal transmitting method that is applied to the facsimile signal transmitting device according to Embodiment 1 of the present invention.

FIG. 4 is an explanatory diagram depicting stored contents of a facsimile signal storage part and restored data storage part.

BEST MODE FOR CARRYING OUT THE INVENTION

To facilitate a better understanding of the present invention, the best mode for carrying out the invention will hereinafter be described in detail with reference to the accompanying drawings.

EMBODIMENT 1

Figure 1:
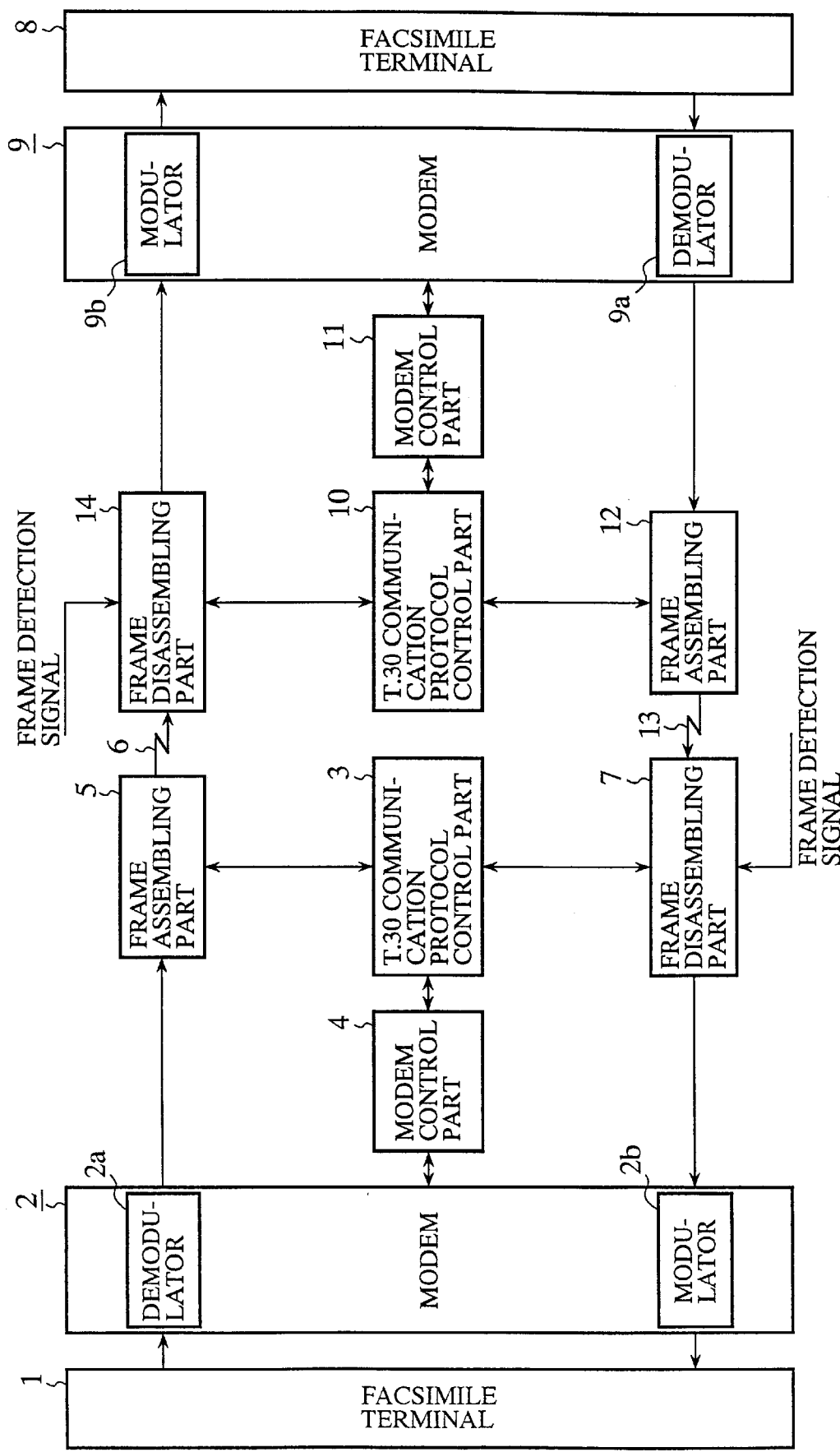
FIG. 1 is a block diagram depicting a conventional facsimile signal transmitting device.
Figure 2:
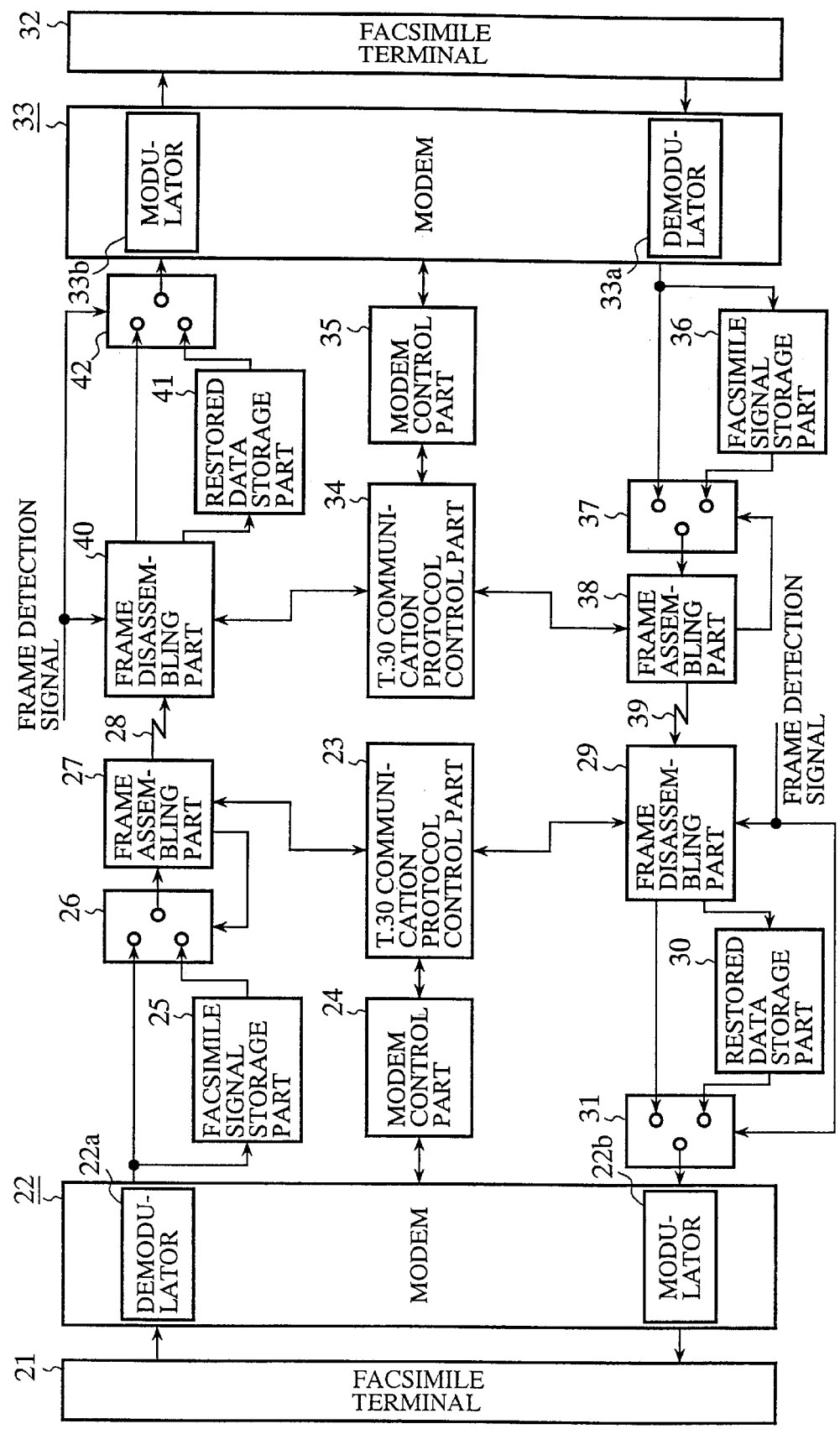
FIG. 2 is a block diagram illustrating a facsimile signal transmitting device according to Embodiment 1 of the present invention.

FIG. 2 illustrates in block form a facsimile signal transmitting device according to Embodiment 1 of the present invention. In FIG. 2, reference numeral 21 denotes a facsimile terminal; 22 denotes a modem which demodulates a facsimile signal provided from the facsimile terminal 1 and modulates a base band facsimile signal transmitted from another facsimile terminal 32; 22a denotes a demodulator of the modem 22; 22b a modulator of the modem 22; 23 denotes a T. 30 communication protocol control part which controls the communication protocol of a facsimile signal; and 24 denotes a modem control part which controls the modem 22 in accordance with a mode setting information provided from the T. 30 communication protocol control part 23.

Reference numeral 25 denotes a facsimile signal storage part (first storage means) for storing base band facsimile signals demodulated by the modem 22; 26 denotes a selector (sending means) which responds to a control signal from a frame assembling part 27 to apply thereto either one of the current facsimile signal provided from the modem 22 and the previous facsimile signal stored in the facsimile signal storage part 25; 27 denotes the frame assembling part (sending means) which, based on a signal from the T. 30 communication protocol control part 23 indicating the kind of the facsimile signal concerned, sequentially combines base band facsimile signals from the selector into frame data of a predetermined size and outputs the frame data onto a transmission line 28; and 28 denotes the transmission line.

Reference numeral 29 denotes a frame disassembling part (receiving means) which receives frame data of a predetermined size provided onto a transmission line 39 and disassembles it into a plurality of base band facsimile signals; 30 denotes a restored data storage part (second storage means) for storing the plurality of base band facsimile signals disassembled by the frame disassembling part 29; and 31 denotes a selector (signal selecting means) which, upon receiving a frame detection signal indicating that frame data has been transmitted without being discarded during transmission, supplies the modem 22 with the oldest one of the plurality of facsimile signals disassembled by the frame disassembling part 29 and, upon receiving a frame detection signal indicating that frame data was discarded during transmission, supplies the modem 22 with a facsimile signal corresponding to the oldest one of the facsimile signals stored in the restored data storage means 30.

Reference numeral 32 denotes a facsimile terminal; 33 denotes a modem of the same function as that of the modem 22; 33a a demodulator of the modem 33; 33b denotes a modulator of the modem 33; 34 denotes a T. 30 communication protocol control part of the same function as that of the T. 30 communication protocol control part 23; 35 denotes a modem control part of the same function as that of the modem control part 25; 36 denotes a facsimile signal storage part (first storage means) of the same function as that of the facsimile signal storage part 25; 38 denotes a selector (sending means) of the same function as that of the selector 26; 38 denotes a frame assembling part (sending means) of the same function as that of the frame assembling part 27; 39 denotes the transmission line; 40 denotes a frame disassembling part (receiving means) of the same function as that of the frame disassembling part 29; 41 denotes a restored data storage part (second storage means) of the same function as that of the restored data storage part 30; and 42 denotes a selector (signal selecting means) of the same function as that of the selector 31.

FIG. 3 is a flowchart showing a facsimile signal transmitting method that is applied to the facsimile signal transmitting device according to Embodiment 1 of the present invention.

Next, the operation of this embodiment will be described below.

For convenience's sake, a description will be given of the operation by which a facsimile signal containing control data necessary for facsimile communication is transmitted from the facsimile terminal 21 to 32.

In the case of transmitting a facsimile signal from the facsimile terminal 21 to 32, the facsimile signal provided in modified form from the facsimile terminal 21 is demodulated by the demodulator 22a of the modem 22 for conversion into a base band facsimile signal with a view to improving the facsimile signal transmission efficiency (step ST1).

Then, when the facsimile signal is thus demodulated and converted into a base band facsimile signal, it is stored in the facsimile signal storage part 25 so as to appropriately combine a plurality of base band facsimile signals into frame data of a predetermined size (step ST2). And, when the current facsimile signal provided from the modem 22 is, for example, an nth facsimile signal (see frame data third from the top in FIG. 4), the frame assembling part 27 applies a control signal to the selector 26 so as to generate frame data by appropriately combining an nth-minus-two facsimile signal provided from the modem 22 in the cycle before last, an nth-minus-one facsimile signal provided from the modem 22 in the last cycle and the nth facsimile signal currently provided from the modem 22, all the facsimile signals being stored in the facsimile signal storage part 25. Then, the frame assembling part executes the process of assembling the frame data (Step ST3).

Upon completion of assembling the frame data, the frame assembling part 27 outputs it onto the transmission line 28 (step ST4), with which facsimile signal transmission process finishes.

When the frame data is provided onto the transmission line 28 as mentioned above, the frame disassembling part 40 disassembles it into a plurality of base band facsimile signals according to a header of the frame data (the header indicating the data structure of the frame data) (step ST5), and the plurality of base band facsimile signals are stored in the restored data storage part 41 (step ST6).

The frame detection signal (a signal indicating whether or not frame data was discarded during transmission) mentioned herein is a signal that is output from a frame discard detecting part (not shown) which makes a check to see if the frame data concerned, provided onto the transmission line 28 from the frame assembling part 27, has been transmitted without being discarded.

And, upon receiving a frame detection signal of a predetermined H-level flag (a frame detection signal indicating that the frame data concerned has been transmitted intact without being discarded during transmission), the selector 42 outputs therethrough to the modem 33 the oldest one of the plurality of facsimile signals disassembled by the frame disassembling part 40 (steps ST7, ST8).

That is, when the plurality of facsimile signals disassembled by the frame disassembling part 40 are those disassembled from the nth frame data (third from the top in FIG. 4), the nth-minus-two facsimile signal is the oldest data, and hence it is provided to the modem 33.

On the other hand, when receiving a frame detection signal of a predetermined L-level flag (a frame detection signal indicating that the frame data concerned was discarded during transmission), the selector 42 outputs therethrough to the modem 33 a facsimile signal corresponding to the oldest one (the nth-minus-two facsimile signal) of the facsimile signals stored in the restored data storage part 41 (steps ST7, ST9).

That is, when the nth frame data (third from the top in FIG. 4) is sent and if it is not discarded, the nth-minus-two facsimile signal ought to be output to the modem 33 as described above; hence, an nth-minus-two facsimile signal is retrieved from the restored data storage part 41 (in which there are stored four facsimile signals, i.e. nth-minus-four through nth-minus-one facsimile signals) and output to the modem 33.

When the base band facsimile signals are thus output from the selector 42 one after another, the modulator 33b of the modem 33 sequentially modulates the base band facsimile signals and provides the demodulated outputs to the facsimile terminal 32 (step ST10), with which the facsimile signal receiving process is completed.

Incidentally, the facsimile terminal 32, when supplied with the modulated facsimile signal from the modulator 33b, demodulates them and executes printing or some other process in accordance with the results of demodulation.

The operation for sending facsimile signals from the facsimile terminal 32 to 21 is identical with the operation for sending facsimile signals from the facsimile terminal 21 to 32; therefore, no description will be repeated.

As is evident from the above, according to this Embodiment 1, when a frame detection signal is received which indicates the discarding of frame data during transmission, a facsimile signal corresponding to the oldest one of the facsimile signals stored in the restored data storage part 30 or 41 is provided to the modem 22 or 33; hence, even if frame data containing control data necessary for facsimile communication is discarded on the transmission line 39 or 28, the facsimile signal that ought to be sent to the facsimile terminal 21 or 32 can be provided to the modem 22 or 33—this produces an effect of preventing the occurrence of a communication abnormality at the facsimile terminal 21 or 32.

EMBODIMENT 2

Figure 5:
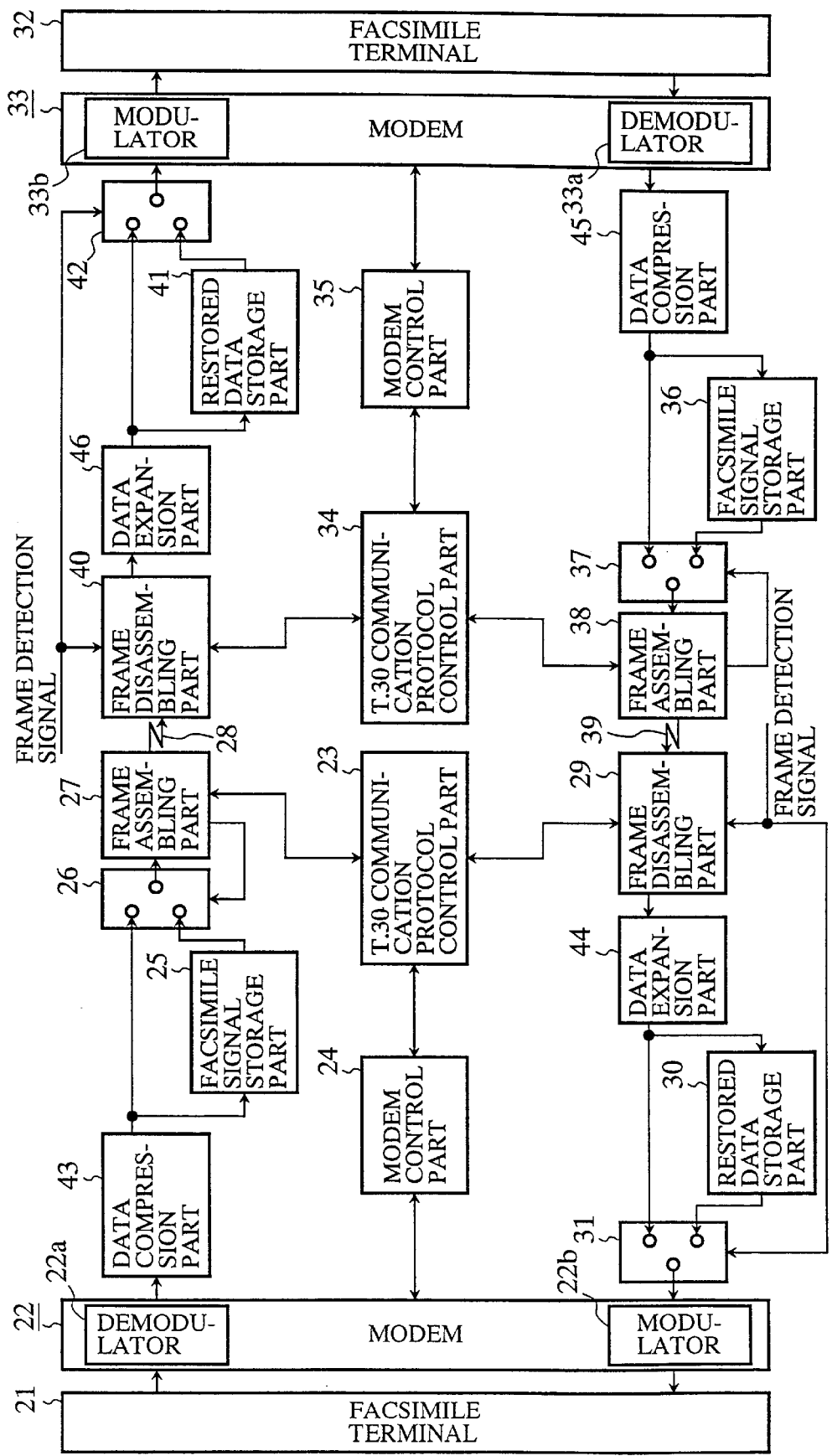
FIG. 5 is a block diagram illustrating a facsimile signal transmitting device according to Embodiment 2 of the present invention.

FIG. 5 is a block diagram illustrating a facsimile signal transmitting device according to Embodiment 2 of the present invention. In FIG. 5 the same reference numerals as those in FIG. 2 denote parts identical with or corresponding to those in FIG. 2, of which no description will be made.

Reference numeral 43 denotes a data compression part (compression means) for data compression of the base band signal that is output from the modem 22; 44 denotes a data expansion part (expansion means) for data expansion of a plurality of facsimile signals disassembled by the frame disassembling part 29; 45 denotes a data compression part (compression means) that has the same function as that of the data compression part 43; and 46 denotes a data expansion part (expansion means) that has the same function as that of the data expansion part 44.

Next, the operation of this embodiment will be described below.

While Embodiment 1 has been described above to send a facsimile signal containing control data necessary for facsimile communication, it is also possible to send a facsimile signal containing image data.

Figure 6:
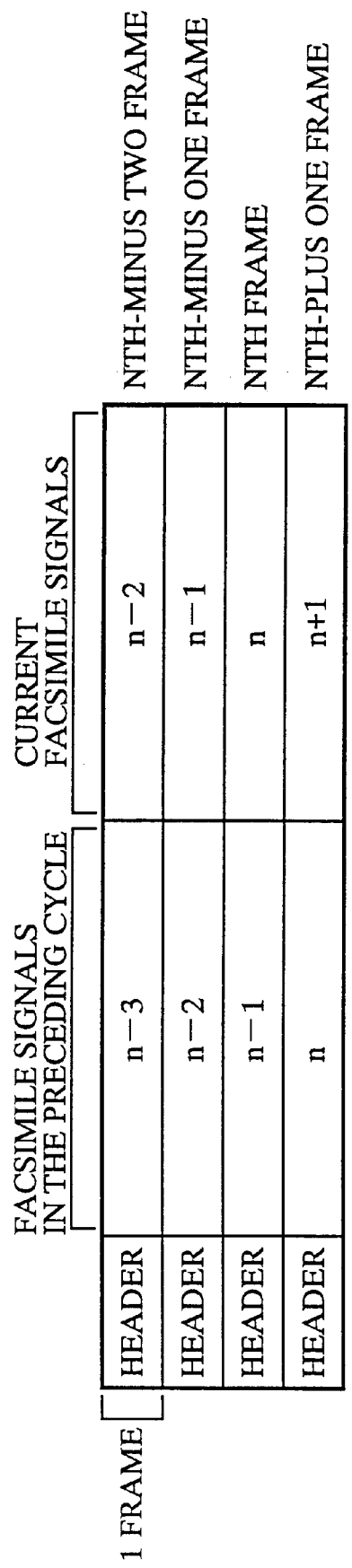
FIG. 6 is an explanatory diagram depicting stored contents of a facsimile signal storage part and restored data storage part.

That is, since image data has a larger number of bytes than does the control data, it is impossible to combine a plurality of facsimile signals into frame data as depicted in FIG. 4. By compressing base band facsimile signals with the data compression part 43 or 45, however, a plurality of facsimile signals can be combined into frame data as depicted in FIG. 6.

With such a scheme, the data expansion parts 44 and 46 connected to the outputs of the frame disassembling parts 29 and 40, respectively, carry out data expansion of base band facsimile signals, so that this embodiment performs the same operation as does Embodiment 1.

Incidentally, according to Embodiment 2, when the plurality of facsimile signals disassembled by the frame disassembling part 40 correspond to nth frame data (frame data third from the top in FIG. 6), the nth-minus-one facsimile signal is the oldest data, and hence it is output to the modem 33.

On the other hand, when the nth frame data was discarded during transmission, the nth-minus-one facsimile signal will ought to be provided to the modem 33 as described above if that frame data is not discarded; hence, the nth-minus-one facsimile signal is retrieved from the restored data storage part 41 (in which there are stored three facsimile signals, i.e. nth-minus three to nth-minus-one facsimile signals) and output to the modem 33.

As is evident from the above, according to this Embodiment 2, data-compressed facsimile signals are combined into frame data, so that even if frame data containing image data is discarded on the transmission line 39 or 28, the facsimile signal that ought to be sent to the facsimile terminal 21 or 32 can be output, and as the result, it is possible to prevent serious image degradation at the facsimile terminal 21 or 32.

Incidentally, it is needless to say that this Embodiment 2 ensures preventing a communication abnormality from being encountered at the facsimile terminal 21 or 32 as is the case with Embodiment 1 even if frame data containing control data is discarded on the transmission line 39 or 28.

EMBODIMENT 3

Figure 7:
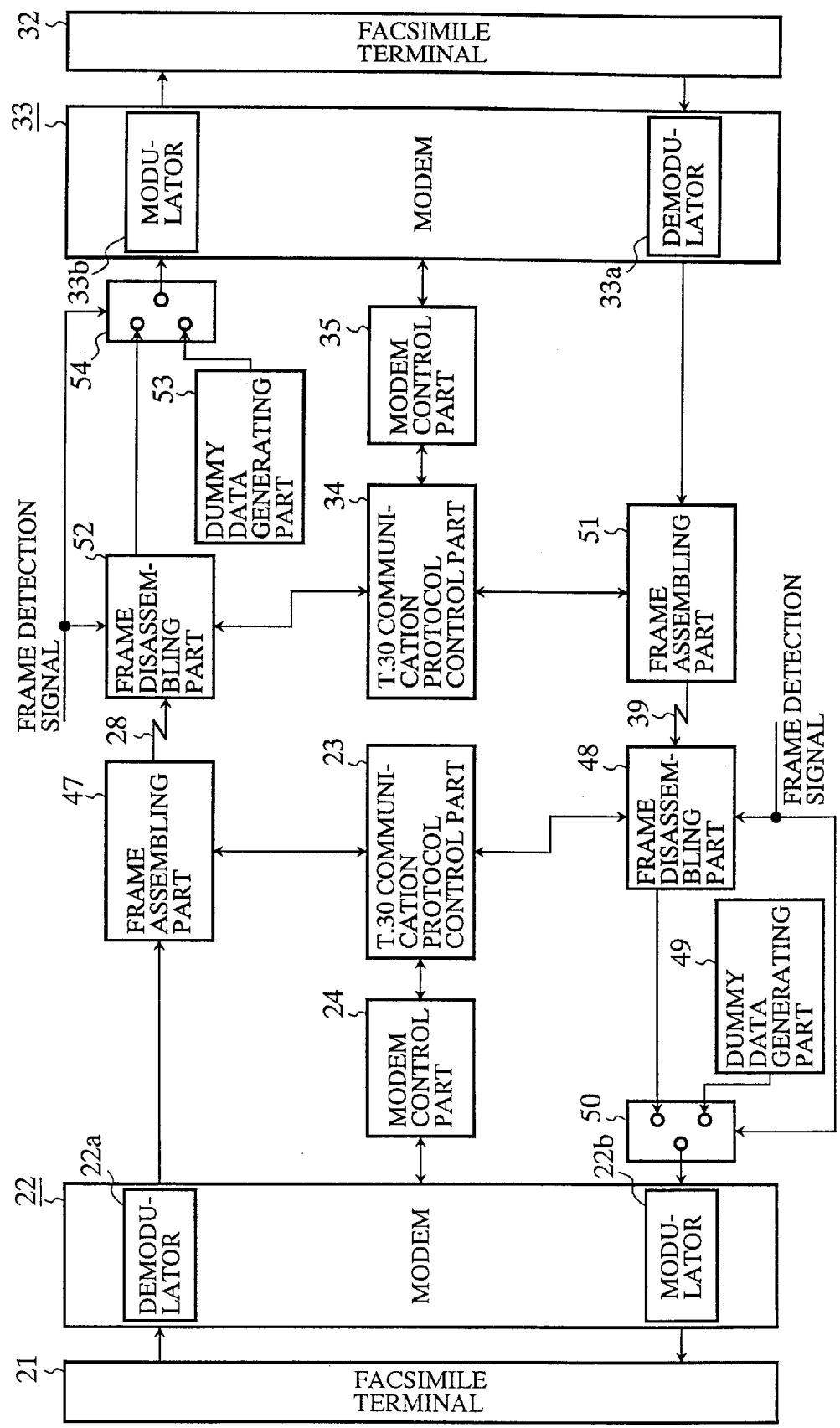
FIG. 7 is a block diagram illustrating a facsimile signal transmitting device according to Embodiment 3 of the present invention.

FIG. 7 is a block diagram illustrating a facsimile signal transmitting device according to Embodiment 3 of the present invention. In FIG. 7 the same reference numerals as those in FIG. 2 denote parts identical with or corresponding to those in FIG. 2, of which no description will be made.

Reference numeral 47 denotes a frame assembling part (sending means) by which, based on a signal provided from the T. 30 communication protocol control part 23 to indicate the kind of the facsimile signal, base band facsimile signals demodulated by the modem 22 are sequentially combined into frame data of a predetermined size and the frame data is provided onto the transmission line 28; and reference numeral 48 denotes a frame disassembling part (receiving means) which receives frame data of a predetermined size provided onto the transmission line 39 and responds to a frame detection signal to disassemble the frame data into a plurality of base band facsimile signals.

Reference numeral 49 denotes a dummy data generating part (signal selecting means) for generating dummy data; and 50 denotes a selector (signal selecting means) which, when receiving the frame detection signal indicative of a facsimile signal having been transmitted without being discarded during transmission, supplies the modem 22 with a facsimile signal disassembled by the frame disassembling part 48 and, when receiving the frame detection signal indicative of a facsimile signal having been discarded during transmission, supplies the modem 22 with the dummy data generated by the dummy data generating part 49.

Reference numeral 51 denotes a frame assembling part (sending means) having the same function as that of the frame assembling part 47; 52 denotes a frame disassembling part (receiving means) having the same function as that of the frame disassembling part 48; 53 denotes a dummy data generating part (signal selecting means) having the same function as that of the dummy data generating part 49; and 54 denotes a selector (signal selecting means) having the same function as that of the selector 50.

Next, the operation of this embodiment will be described below.

Embodiments 1 and 2 each have been described to have a configuration in which when frame data is discarded during transmission, the facsimile signals stored in the restored data storage parts 30 and 41 in the preceding cycle are output therefrom to the modems 22 and 33; however, dummy data may also be output to the modems 22 and 23 when the frame data is discarded during transmission.

Figure 8:
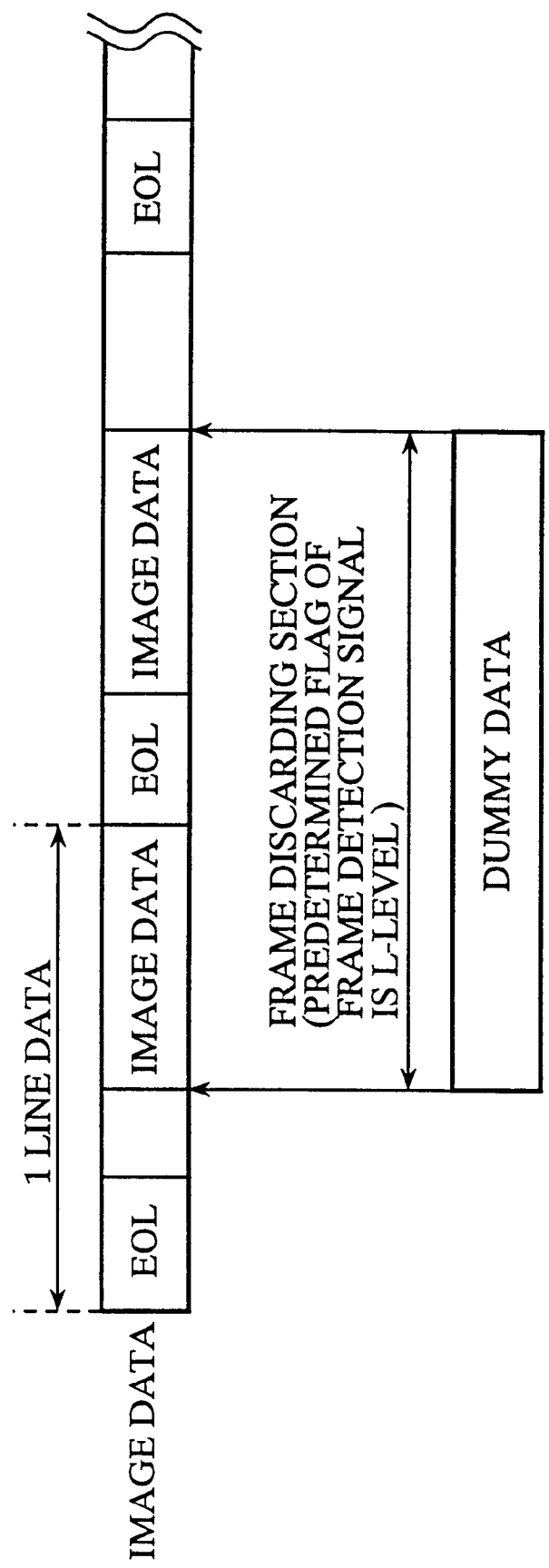
FIG. 8 is an explanatory diagram showing a section into which dummy data is inserted.

That is, it is possible to employ a system configuration in which the dummy data generating parts 49 and 53 pregenerate and prestore fill data (data "0") as the dummy data and the selector 50 and 54 apply therethrough the dummy data to the modem 22 and 33 as substitutes for the facsimile signals from the frame disassembling parts 48 and 52, respectively, only while the predetermined flag of the frame detection signal is L-level (indicating that the frame data concerned was discarded during transmission) (see FIG. 8).

With such a scheme, even if frame data was discarded during transmission, dummy data is applied, as a substitute for the discarded frame data (facsimile signal), to the facsimile terminal 21 or 32, enabling it to continue execution of the decoding process, and consequently preventing the occurrence of a communication abnormality at the facsimile terminal 21 or 32. (When not supplied with any data despite frame data having been discarded, the facsimile terminals 21 and 32 cannot execute the decoding process, sometimes resulting in a communication abnormality being encountered at the facsimile terminals 21 and 32.

Incidentally, fill data is used as dummy data in this embodiment; since it is ignored as data when decoded at the facsimile terminals 21 and 32, there is no fear of the fill data adversely affecting communication control at the facsimile terminals 21 and 32.

EMBODIMENT 4

Embodiment 3 has been described above to use fill data as dummy data, white line data may be used as the dummy data—this also produces the same effect as is obtainable with Embodiment 3.

When the white line data is used as dummy data, the printed output will contain a blank at the place concerned.

EMBODIMENT 5

Figure 9:
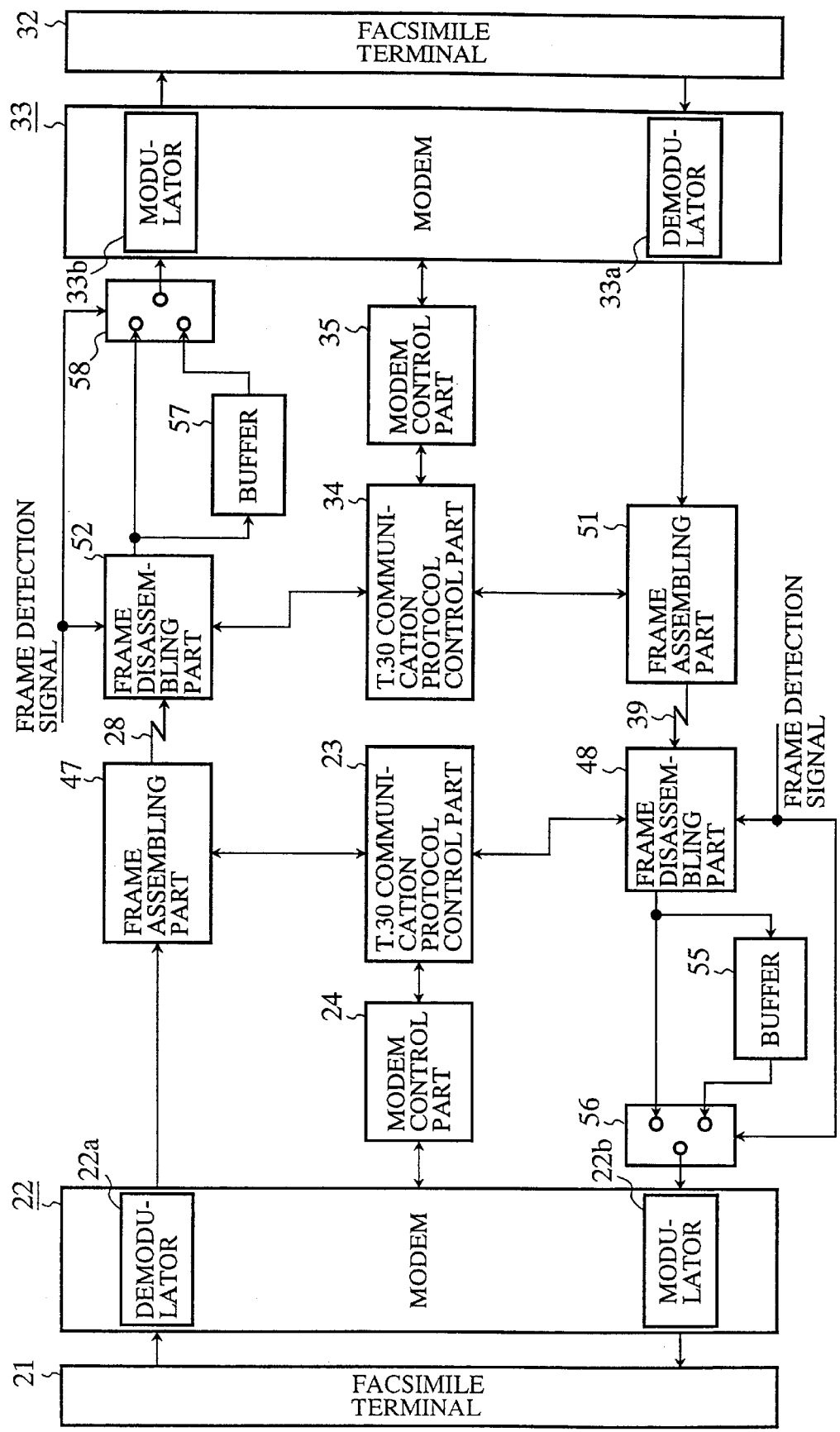
FIG. 9 is a block diagram illustrating a facsimile signal transmitting device according to Embodiment 5 of the present invention.

FIG. 9 is a block diagram illustrating a facsimile signal transmitting device according to Embodiment 5 of the present invention. In FIG. 9, since the same reference numerals as those in FIG. 7 denote the parts identical with or corresponding to those used therein, no description will be made of them.

Reference numeral 55 denotes a buffer (storage means) for temporarily storing facsimile signals disassembled by the frame disassembling part; 56 denotes a selector (signal selecting means) which, when receiving the frame detection signal indicative of a facsimile signal having been transmitted without being discarded during transmission, supplies the modem 22 with a facsimile signal disassembled by the frame disassembling part 48 and, when receiving the frame detection signal indicative of a facsimile signal having been discarded during transmission, supplies the modem 22 with the preceding facsimile signal stored in the buffer 55.

Reference numeral 57 denotes a buffer storage means) equipped with the same function as that of the buffer 55, and 58 denotes a selector (signal selecting means) equipped with the same function as that of the selector 56.

Next, the operation of this embodiment will be described below.

While Embodiments 3 and 4 each have been described to have a configuration in which when frame data is discarded during transmission, dummy data is output to the modems 22 and 32, it is also possible to employ a system configuration in which the preceding facsimile signals stored in the buffers 55 and 57 are output therefrom to the modems 22 and 33 when the frame data is discarded during transmission.

That is, the buffers 55 and 57 update the facsimile signals stored therein whenever the frame disassembling parts 48 and 52 output thereto facsimile signals. The selector 56 and 58 apply therethrough the preceding facsimile signals, stored in the buffers 55 and 57, to the modem 22 and 33 as substitutes for the facsimile signals from the frame disassembling parts 48 and 52 only while the predetermined flag of the frame detection signal is L-level (indicating that the frame data concerned was discarded during transmission).

With such a scheme, too, it is possible to prevent a communication abnormality from occurrence at the facsimile terminals 21 and 32 because the preceding facsimile signals can be provided, as substitutes for discarded frame data (facsimile signals), to the facsimile terminals 21 and 32 without using the large capacity restored data storage parts 30 and 42 such as needed in Embodiment 1 and other embodiments.

EMBODIMENT 6

Figure 10:
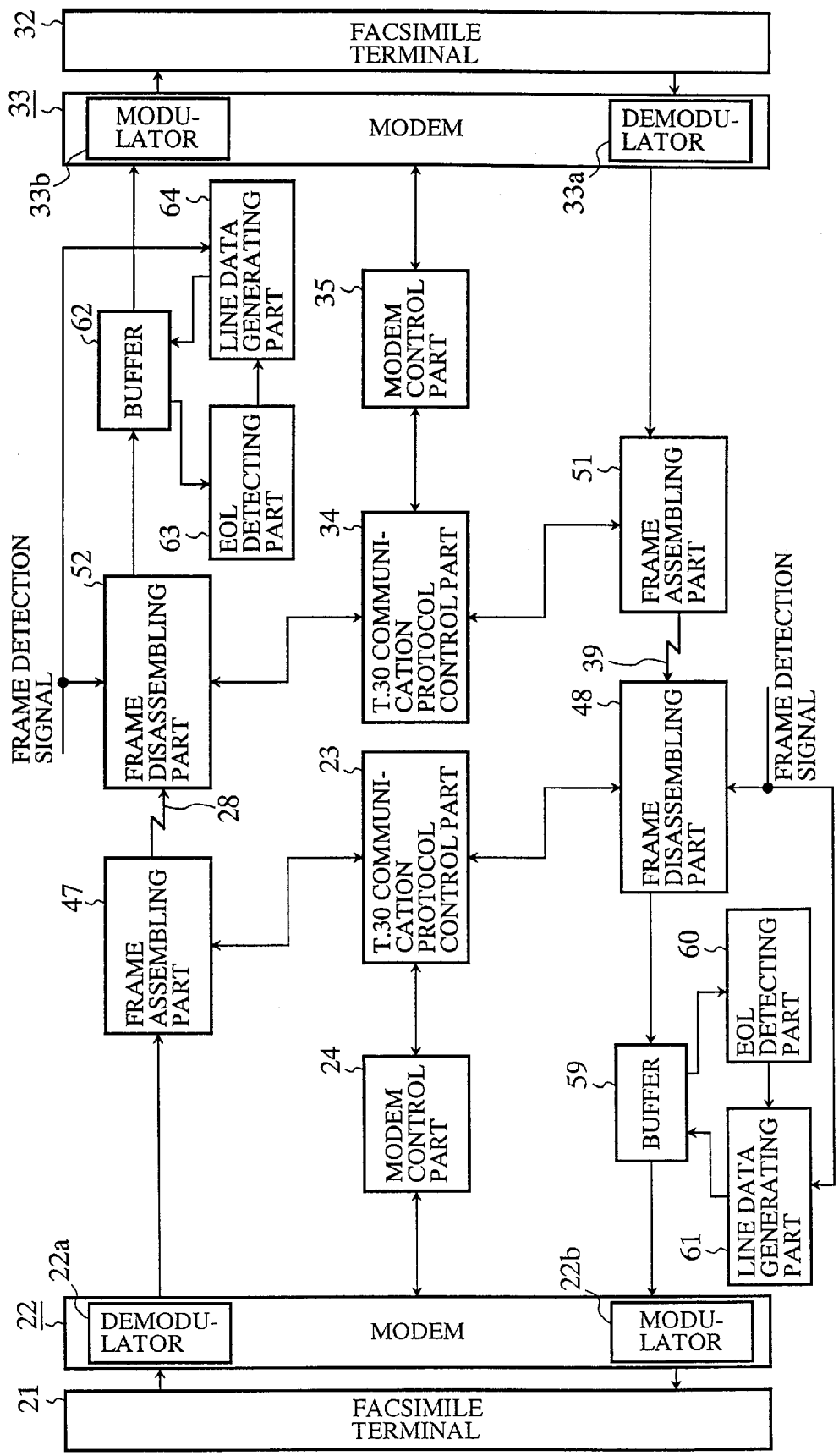
FIG. 10 is a block diagram illustrating a facsimile signal transmitting device according to Embodiment 6 of the present invention.

FIG. 10 is a block diagram illustrating a facsimile signal transmitting device according to Embodiment 6 of the present invention. In FIG. 10, the same reference numerals as those in FIG. 7 denote the parts identical with or corresponding to those used therein, and hence no description will be given of them.

Reference numeral 59 denotes a buffer (signal selecting means) for temporarily storing facsimile signals disassembled by the frame disassembling part 48; 60 denotes an EOL detecting part (detecting means) for detecting an end code EOL of each facsimile signal disassembled by the frame disassembling part 48; and 61 denotes a line data generating part (signal selecting means) which, when receiving a frame detection signal indicative of a facsimile signal having been transmitted without being discarded during transmission, causes the buffer 59 to output the facsimile signals stored therein to the modem 22 and which, when receiving a frame detection signal indicative of a facsimile signal having been discarded during transmission, inserts predetermined line data between the end codes EOL of the facsimile signals detected by the EOL detecting part 60 and then causes the facsimile signals to be output to the modem 22.

Reference numeral 62 denotes a buffer (signal selecting means) equipped with the same function as that of the buffer 59; 63 denotes an EOL detecting part (detecting means) equipped with the same function as that of the EOL detecting part 60; and 64 denotes a line data generating part (signal selecting means) equipped with the same function as that of the line data generating part 61.

Next, the operation of this embodiment will be described below.

Since this embodiment is identical in construction with Embodiment 5 and others except the buffers 59, 62, the EOL detecting part 60, 63 and the line data generating parts 61, 64, the following description will be made mainly of the operations of the buffers 59, 62, the EOL detecting parts 60, 63 and the line data generating parts 61, 64.

Figure 11:
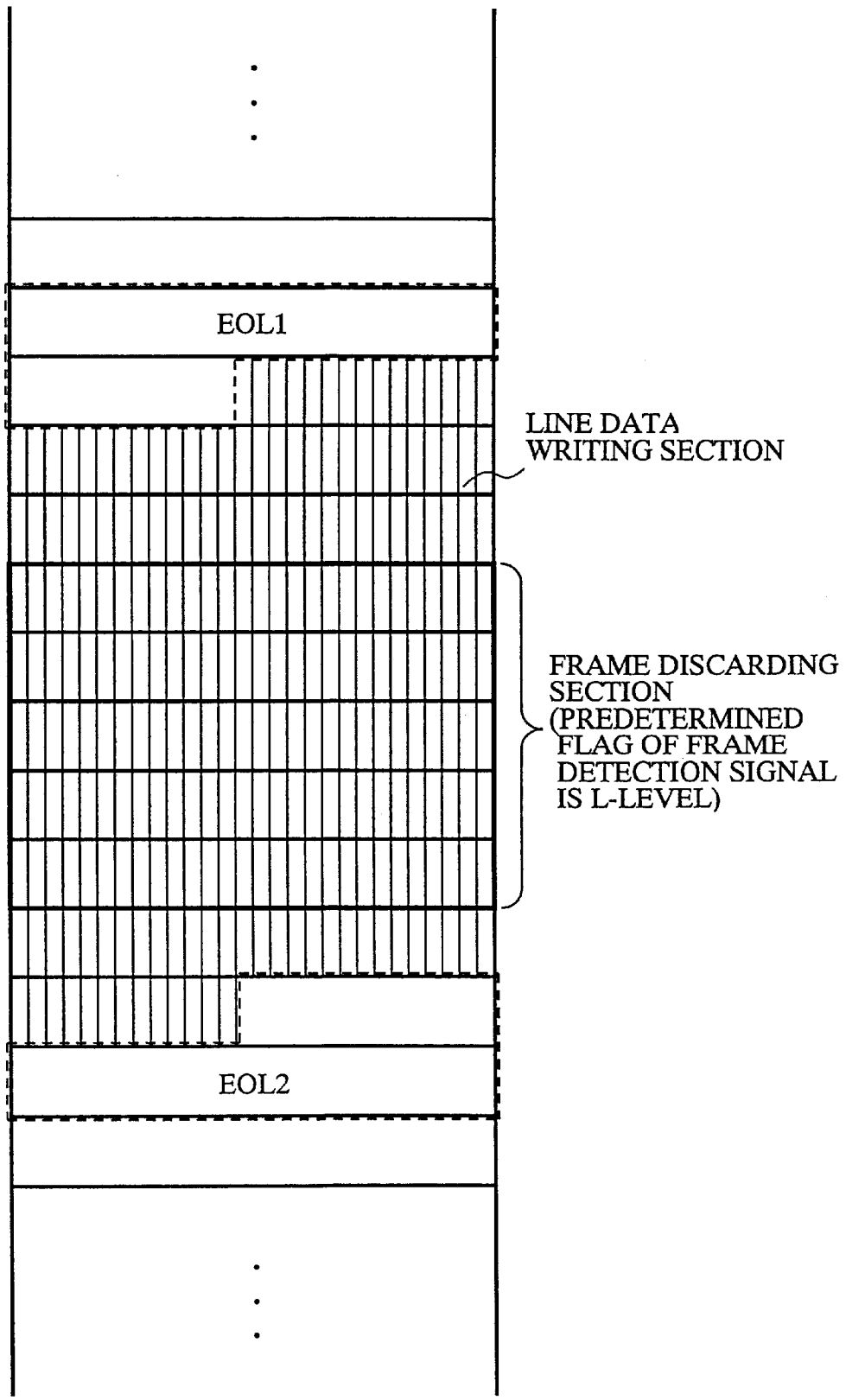
FIG. 11 is an explanatory diagram showing a section for the insertion thereinto line data.

That is, when supplied with base band facsimile signals from the frame disassembling parts 48 and 52, the buffers 59 and 62 store the base band facsimile signals on a word-by-word basis as depicted in FIG. 11.

And, when the base band facsimile signals are thus stored in the buffers 59 and 62 on the word-by-word basis, the EOL detecting parts 60 and 63 detect the end codes EOL of the facsimile signals.

And, when a predetermined flag of the frame detection signals is H-level (indicating that the facsimile signal concerned has been transmitted without being discarded during transmission), the line data generating parts 61 and 64 cause the buffers 59 and 62 to apply the base band facsimile signals stored therein to the modems 22 and 23; however, when the predetermined flag of the frame detection signal goes down to the L level (indicating that the facsimile signal concerned was discarded during transmission) during the time interval between the end codes EOL (between EOL1 and EOL2 in FIG. 11) of adjacent facsimile signals, the line data generating parts each insert pregenerated fill data (data "0"), as line data, between the end codes EOL of the adjacent facsimile signals (as indicated by vertical stripes) to thereby rewrite the contents of the facsimile signals stored in the buffers 59 and 62, and cause the facsimile signals of the rewritten contents to be fed to the modems 22 and 32.

As will be seen from the above, according to this Embodiment 6, even if frame data containing image data is discarded during transmission, predetermined line data (facsimile signals stored on the word-by-word basis) is provided as a substitute for the discarded frame data to the facsimile terminals 21 and 32; that is, the end codes EOL are detected and data between the end codes EOL are all rewritten into predetermined line data. Hence, this embodiment involves somewhat complex processing but produces an effect of reducing the image degradation as compared with Embodiments 3 through 5.

EMBODIMENT 7

Embodiment 6 has been described above to use fill data as line data, white line data may be used as the line data—this also produces the same effect as is obtainable with Embodiment 6.

When the white line data is used as line data, the printed output will contain a blank at the place concerned.

EMBODIMENT 8

Figure 12:
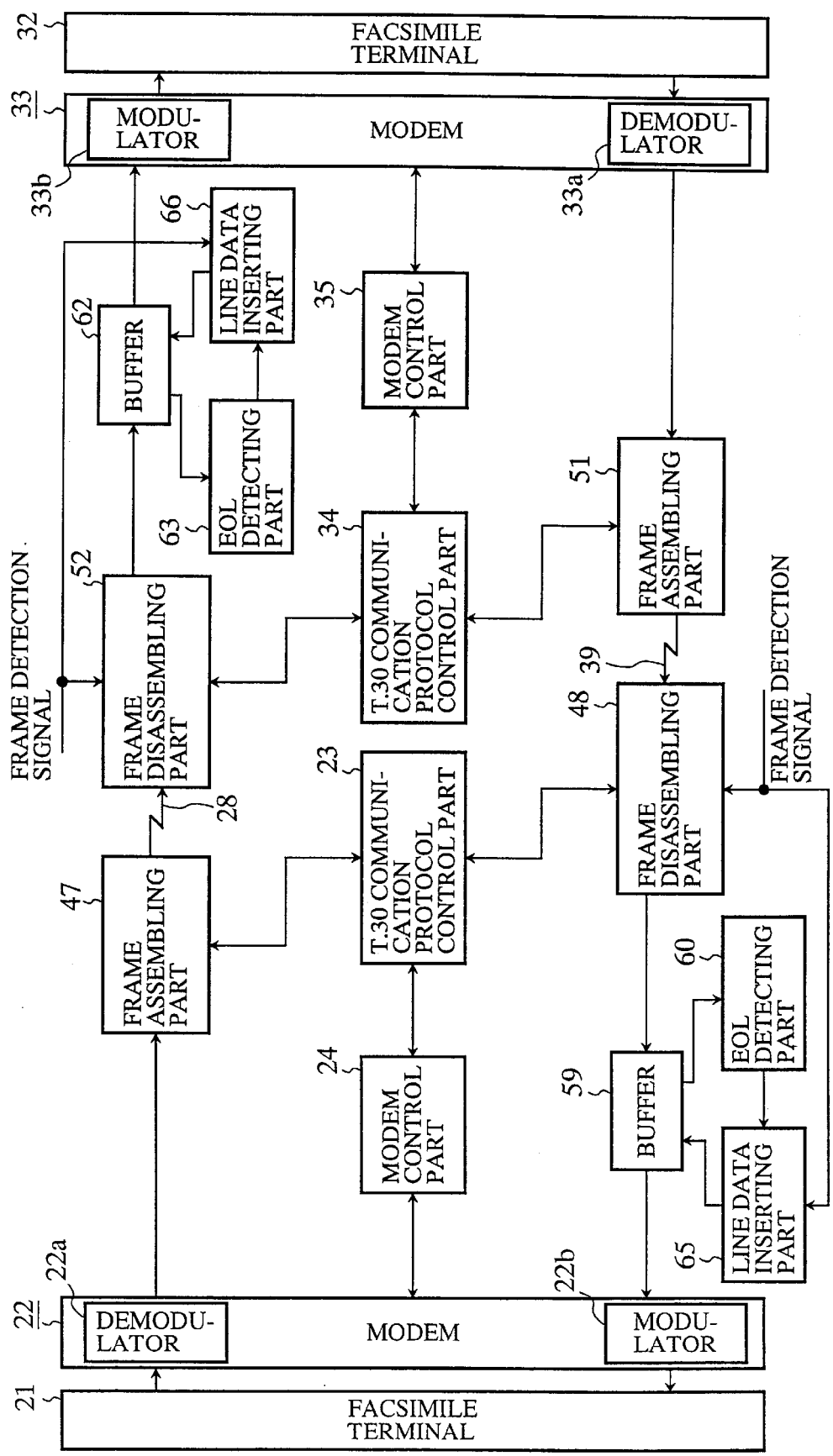
FIG. 12 is a block diagram illustrating a facsimile signal transmitting device according to Embodiment 8 of the present invention.

FIG. 12 is a block diagram illustrating a facsimile signal transmitting device according to Embodiment 8 of the present invention. In FIG. 12 the same reference numerals as those in FIG. 10 denote the parts identical with or corresponding to those used therein; hence no description will be given of them.

Reference numeral 65 denotes a line data inserting part (signal selecting means) which, when receiving a frame detection signal indicating that the facsimile signal concerned has been transmitted without being discarded during transmission, causes the buffer 59 to apply the facsimile signal stored therein to the modem 22 and which, when receiving a frame detection signal indicating that the facsimile signal concerned was discarded during transmission, inserts the facsimile signal of the preceding or following cycle between the end codes EOL of the facsimile signals detected by the EOL detecting part 60 and causes the resulting facsimile signal to be fed to the modem 22.

Reference numeral 66 denotes a line data inserting part (signal selecting means) having the same function as that of the line data inserting part 65.

Next, the operation of this embodiment will be described below.

Figure 13:
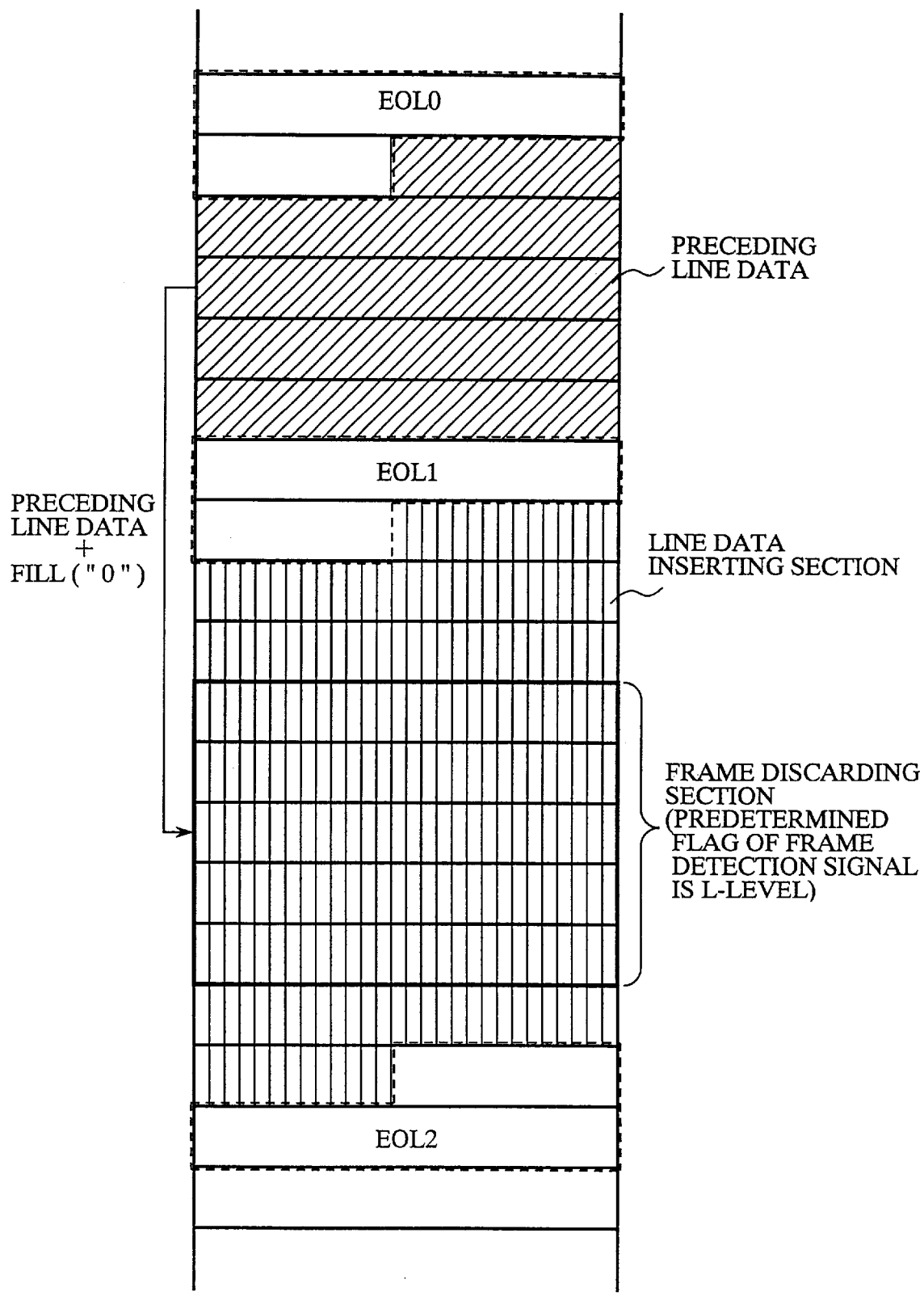
FIG. 13 is an explanatory diagram showing a section for the insertion thereinto line data.

While Embodiments 6 and 7 have been described above inserting specific line data when a facsimile signal is discarded during transmission, it is also possible to employ a system configuration in which the line data inserting parts 65 and 66 each insert, as the line data, the preceding or following facsimile signal disassembled by each of the frame disassembling parts 48 and 42 as depicted in FIG. 13.

In this instance, however, when the amount of data of the facsimile signal to be inserted is smaller than the amount of data in the time interval in which to insert the facsimile signal, the shortage is supplemented with fill data.

In the reverse case, white line data and fill data, for instance, are inserted in place of the preceding or following facsimile signal.

This scheme ensures the insertion of a facsimile signal more closely related to the discarded facsimile signal than in the cases of Embodiments 6 and 7, and hence permits further reduction of the image degradation.

EMBODIMENT 9

Figure 14:
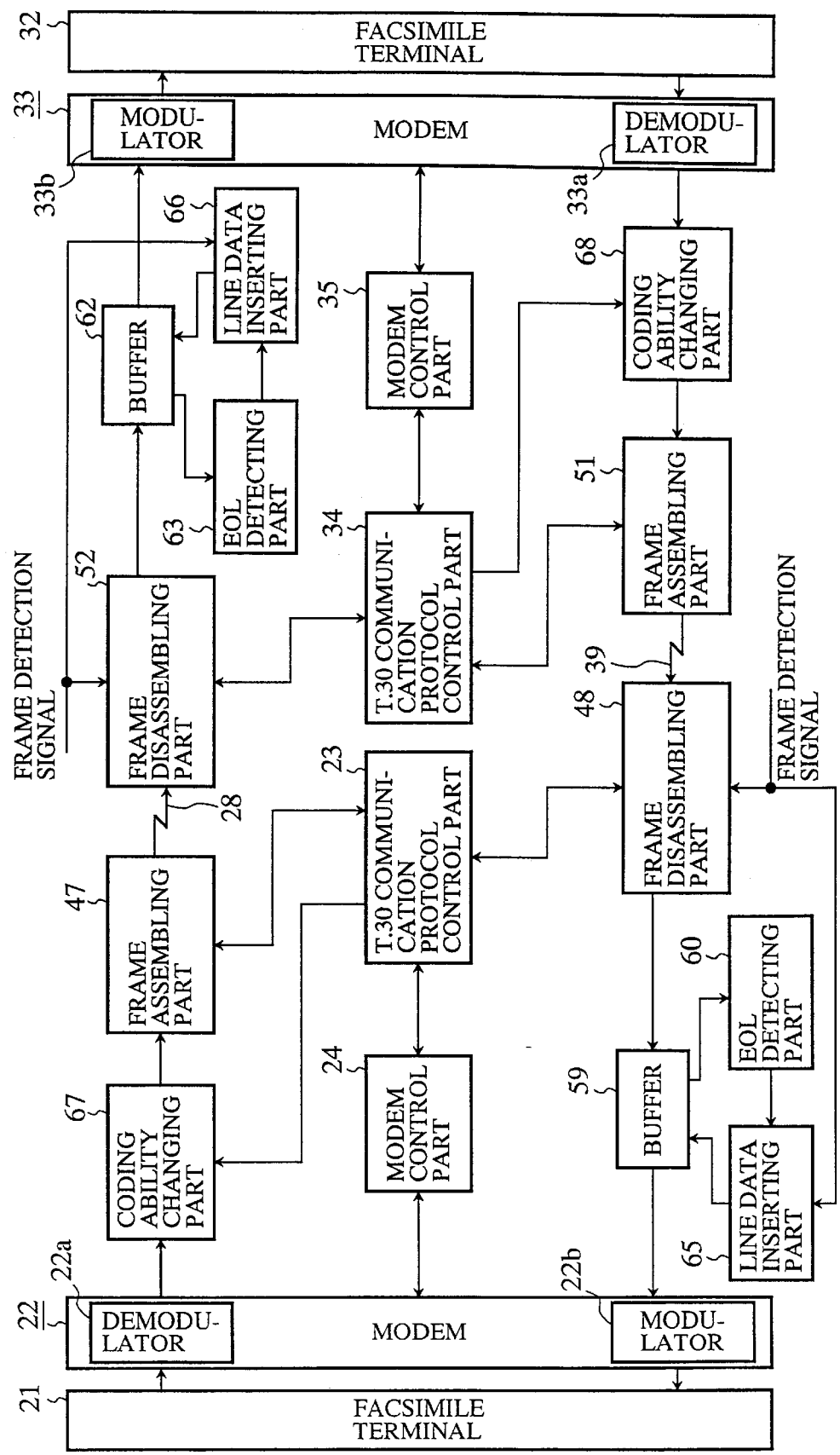
FIG. 14 is a block diagram illustrating a facsimile signal transmitting device according to Embodiment 9 of the present invention.

FIG. 14 is a block diagram illustrating a facsimile signal transmitting device according to Embodiment 9 of the present invention. In FIG. 14 the same reference numerals as those in FIG. 12 denote that parts identical with or corresponding to those used therein; hence, no description will be made of them.

Reference numeral 67 denotes a coding ability changing part (sending means) whereby a control signal representing the coding scheme of the facsimile terminal 21, contained in the facsimile signal, is changed from a two-dimensional to a one-dimensional coding system; and 68 denotes a coding ability changing part (sending means) common in function to the coding ability changing part 67.

Next, the operation of this embodiment will be described below.

While Embodiments 1 through 8 make no particular reference to the coding system of the facsimile terminals 21 and 32, it is customary to adopt the two-dimensional coding system as the coding system of the facsimile terminals 21 and 32 when both of them can use the two-dimensional coding system.

The two-dimensional coding system mentioned herein is one that encodes facsimile signals of plural lines (two or four lines) en bloc (The two-dimensional coding system is defined in ITU-T Recommendation T. 4).

In the case of using the two-dimensional coding system, however, there is a defect that discarding part of the frame data containing image data will affect facsimile signals of plural lines coded en bloc, resulting in an increase in image degradation.

In view of the above, according to this Embodiment 9, the coding ability changing parts 67 and 68 change the control signals indicating the coding systems of the facsimile terminals 21 and 32 from the two-dimensional to the one-dimensional coding system (The one-dimensional coding system is adopted when the control signal for either one of the facsimile terminals 21 and 32 indicates the use of the one-dimensional coding system).

The one-dimensional coding system mentioned herein is a system that encodes facsimile signals every line.

As is evident from the above, according to this Embodiment 9, since the coding system of the facsimile terminals 21 and 32 is switched from the two-dimensional to the one-dimensional coding system, the influence of the discarded facsimile signal is localized, and as a result, the preceding and succeeding facsimile signals are free from the influence of the discarded facsimile signal—this permits further reduction of image degradation than in the case of using the two-dimensional coding system.

EMBODIMENT 10

Figure 15:
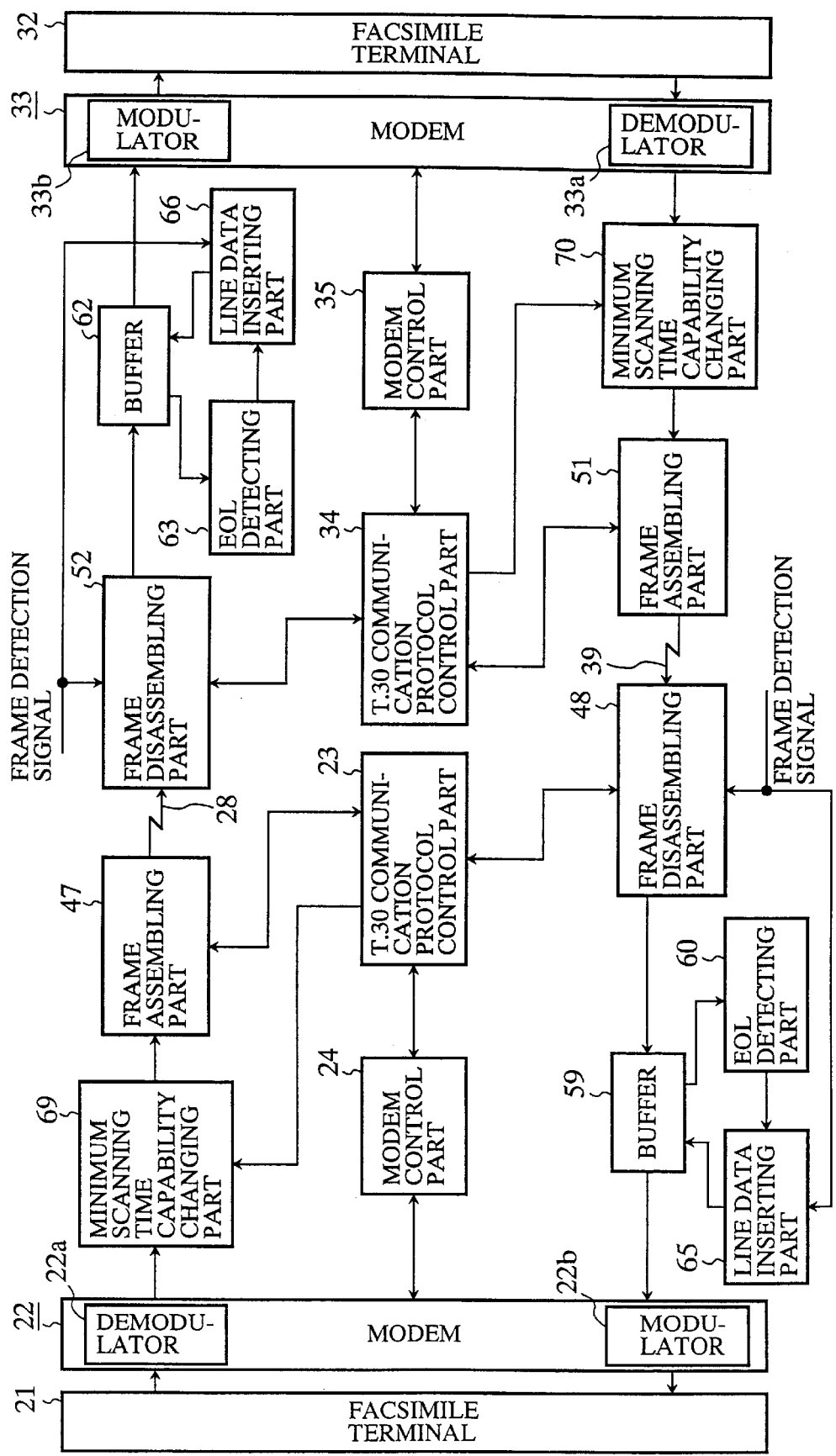
FIG. 15 is a block diagram illustrating a facsimile signal transmitting device according to Embodiment 10 of the present invention.

FIG. 15 is a block diagram illustrating a facsimile signal transmitting device according to Embodiment 10 of the present invention. In FIG. 15 the same reference numerals as those in FIG. 14 denote the parts identical with or corresponding to those used therein; hence, no description will be repeated in connection with them.

Reference numeral 69 denotes a minimum scanning time capacity changing part (sending means) whereby a control signal indicating the minimum scanning time of the facsimile terminal 21, contained in a facsimile signal, is changed; and 70 denotes a minimum scanning time capacity changing part (sending means) common in function to the minimum scanning time capacity changing part 69.

Next, the operation of this embodiment will be described below.

While Embodiment 9 has been described above to change the coding system of the facsimile terminals 21 and 32, it is also possible to change the minimum scanning time capacity of the facsimile terminals 21 and 32.

That is, the minimum scanning time capacity is a capacity that represents the image data processing time per line (processing time for decoding, processing time for printing, and so forth) at the facsimile terminals 21 and 32. When the image data transmitting time is shorter than such a processing time, processing of each line cannot be completed in time.

For example, when the processing time per line is 20 msec, the above-mentioned problem will arise if the image data transmitting time is shorter than 20 msec.

In view of the above, when the time taken to transmit image data of one line is shorter than the minimum scanning time, the facsimile terminals 21 and 32 usually transmit the image data after adding thereto fill data so that the image data transmitting time becomes equal to or longer than the minimum scanning time.

In concrete terms, the minimum scanning time capacity changing parts 69 and 70 lengthen the minimum scanning time by suitably changing the control signal representative of the minimum scanning time.

This scheme increases the number of pieces of data transmitted per line, and hence localizes the influence of the discarded facsimile signal, permitting further reduction of image degradation as compared with Embodiment 1 and other embodiments.

EMBODIMENT 11

Although Embodiments 1 through 10 have been described above to have both of sending and receiving means, they may also have only either one of the sending and receiving means.

INDUSTRIAL APPLICABILITY

As described above, the facsimile signal transmitting device and the facsimile signal transmitting method according to the present invention are suitable for improving the facsimile signal transmission efficiency in the transmission of facsimile signals over an ATM network, packet communication network or the like.

What is claimed is:

1. A facsimile signal transmitting device comprising: first storage means for storing therein facsimile signals provided from a transmitting facsimile terminal; transmitting means for generating frame data by combining the current facsimile signals provided from said transmitting facsimile terminal and the previous facsimile signals stored in said first storage means and for outputting said frame data onto a transmission line; receiving means for receiving said frame data when it is provided by said transmitting means onto said transmission line and for disassembling said frame data into a plurality of facsimile signals; second storage means for storing therein said plurality of facsimile signals disassembled by said receiving means; and signal selecting means which, when receiving a frame detection signal indicating that said frame data provided on said transmission line has been transmitted without being discarded during transmission, supplies a receiving facsimile terminal with the oldest one of said plurality of facsimile signals disassembled by said receiving means and, when receiving a frame detection signal indicating that said frame data was discarded during transmission, supplies said receiving facsimile terminal with a facsimile signal corresponding to the oldest one of said facsimile signals stored in said second storage means.

2. A facsimile signal transmitting device as recited in claim 1, characterized in that, when outputting said facsimile signals onto said transmission line, said transmitting means adds a concerned one of said facsimile signals with a control signal indicating the use of a first-dimensional coding method (MH coding method) as the coding system of said facsimile terminals.

3. A facsimile signal transmitting device as recited in claim 1, characterized in that, when outputting said facsimile signals onto said transmission line, said transmitting means adds a concerned one of said facsimile signals with a control signal indicating the minimum scanning time of said facsimile terminals while at the same time suitably changing said minimum scanning time.

4. A facsimile signal transmitting device comprising: compressing means for data compressing facsimile signals provided from a transmitting facsimile terminal; first storage means for storing therein said facsimile signals compressed by said compressing means; sending means for generating frame data by combining the current facsimile signals compressed by said compressing means and the previous facsimile signals stored in said first storage means and for outputting said frame data onto a transmission line; receiving means for receiving said frame data when it is provided by said transmitting means onto said transmission line and for disassembling said frame data into a plurality of facsimile signals; expanding means for data expanding said plurality of facsimile signals disassembled by said receiving means; second storage means for storing therein said plurality of facsimile signals expanded by said expanding means; and signal selecting means which, when receiving a frame detection signal indicating that said frame data provided on said transmission line has been transmitted without being discarded during transmission, supplies a receiving facsimile terminal with the oldest one of said plurality of facsimile signals expanded by said expanding means and, when receiving a frame detection signal indicating that said frame data was discarded during transmission, supplies said receiving facsimile terminal with a facsimile signal corresponding to the oldest one of said facsimile signals stored in said second storage means.

5. A facsimile signal transmitting device comprising: transmitting means for outputting onto a transmission line facsimile signals provided from a transmitting facsimile terminal; receiving means for receiving said facsimile signals when they are provided by said transmitting means onto said transmission line; and signal selecting means which, when receiving a frame detection signal indicating that said facsimile signals provided on said transmission line have been transmitted without being discarded during transmission, supplies a receiving facsimile terminal with said facsimile signals received by said receiving means and, when receiving a frame detection signal indicating that said facsimile signals were discarded during transmission, supplies said receiving facsimile terminal with dummy data.

6. A facsimile signal transmitting device as claimed in claim 5, characterized in that said signal selecting means outputs fill data as said dummy data.

7. A facsimile signal transmitting device as claimed in claim 5, characterized in that said signal selecting means outputs white line data as said dummy data.

8. A facsimile signal transmitting device comprising: transmitting means for outputting onto a transmission line facsimile signals provided from a transmitting facsimile terminal; receiving means for receiving said facsimile signals when they are output by said transmitting means onto said transmission line; storage means for storing therein said facsimile signals received by said receiving means; and signal selecting means which, when receiving a frame detection signal indicating that said facsimile signals provided on said transmission line have been transmitted without being discarded during transmission, supplies a transmitting facsimile terminal with said facsimile signals received by said receiving means and, when receiving a frame detection signal indicating that said facsimile signals were discarded during transmission, supplies said receiving facsimile terminal with previous facsimile signals stored in said storage means.

9. A facsimile signal transmitting device comprising: transmitting means for outputting onto a transmission line facsimile signals provided from a transmitting facsimile terminal; receiving means for receiving said facsimile signals when they are output onto said transmission line by said transmitting means; detecting means for detecting an end of line code of each of said facsimile signals received by said receiving means; and signal selecting means which, when receiving a frame detection signal indicating that said facsimile signals provided on said transmission line have been transmitted without being discarded during transmission, supplies a receiving facsimile terminal with said facsimile signals received by said receiving means and, when receiving a frame detection signal indicating that said facsimile signals were discarded during transmission, inserts predetermined line data between said end of line codes of said facsimile signals detected by said detecting means and supplies said receiving facsimile terminal with said facsimile signals having said line data inserted between their end of line codes.

10. A facsimile signal transmitting device as recited in claim 9, characterized in that said signal selecting means inserts fill data as said predetermined line data.

11. A facsimile signal transmitting device as recited in claim 9, characterized in that said signal selecting means inserts white line data as said predetermined line data.

12. A facsimile signal transmitting device as recited in claim 9, characterized in that said signal selecting means inserts, as said predetermined line data, previous or succeeding facsimile signals received.

13. A facsimile signal transmitting method wherein: facsimile signals output from a transmitting facsimile terminal are stored; current facsimile signals from said transmitting facsimile terminal and preceding facsimile signals are combined into frame data; said frame data is output onto a transmission line; when provided onto said transmission line, said frame data is received and disassembled into a plurality of facsimile signals; said plurality of facsimile signals are stored; when a frame detection signal is received which indicates that said frame data provided on said transmission line has been transmitted without being discarded during transmission, the oldest one of said plurality of disassembled facsimile signals is output to a receiving-side facsimile terminal; and when a frame detection signal is received which indicates that said frame data was discarded during transmission, a facsimile signal corresponding to the oldest one of said stored facsimile signals is output to said receiving facsimile terminal.

14. A facsimile signal transmitting method ads recited in claim 13, characterized in that when said facsimile signals are output onto said transmission line, a control signal indicating the use of a first-dimensional coding method (MH coding method) as the coding system of said facsimile terminals is added to said facsimile signals.

15. A facsimile signal transmitting method as recited in claim 13, characterized in that when said facsimile signals are output onto said transmission line, a control signal indicating the minimum scanning time of said facsimile terminals is added to said facsimile signals and said minimum scanning time is suitably changed.

16. A facsimile signal transmitting method wherein: facsimile signals output from a transmitting facsimile terminal are data compressed and stored; the current and previous compressed facsimile signals are combined into frame data; said frame data is output onto a transmission line; when output onto said transmission line, said frame data is received and disassembled into a plurality of facsimile signals; said plurality of facsimile signals are data expanded and stored; when a frame detection signal is received which indicates that said frame data provided on said transmission line has been transmitted without being discarded during transmission, the oldest one of-said plurality of expanded facsimile signal is output to a receiving facsimile terminal; and when a frame detection signal is received which indicates that said frame data was discarded during transmission, a facsimile signal corresponding to the oldest one of said stored facsimile signal is output to said receiving facsimile terminal.

17. A facsimile signal transmitting method wherein: facsimile signals provided from a transmitting facsimile terminal are-output onto a transmission line; when output onto said transmission line, said facsimile signals are received; when a frame detection signal is received which indicates said facsimile signals provided on said transmission line have been transmitted without being discarded during transmission, said received facsimile signals are output to a receiving facsimile terminal; and when a frame detection signal is received which indicates that said facsimile signals were discarded during transmission, dummy data is output to said receiving facsimile terminal.

18. A facsimile signal transmitting method as recited in claim 17, characterized in that fill data is output as said dummy data which is provided to said receiving facsimile terminal.

19. A facsimile signal transmitting method as recited in claim 17, characterized in that white line data is output as said dummy data which is provided to said receiving facsimile terminal.

20. A facsimile signal transmitting method wherein: facsimile signals provided from a transmitting facsimile terminal are output onto a transmission line; when output onto said transmission line, said facsimile signals are received and stored; when a frame detection signal is received which indicates that said facsimile signals provided on said transmission line have been transmitted without being discarded during transmission, said received facsimile signals are output to a receiving facsimile terminal; and when a frame detection signal is received which indicates that said facsimile signals were discarded during transmission, facsimile signals stored previously are output to said receiving facsimile terminal.

21. A facsimile signal transmitting method wherein: facsimile signals provided from a transmitting facsimile terminal are output onto a transmission line; when output onto said transmission line, said facsimile signals are received; and when a frame detection signal is received which indicates that said facsimile signals provided on said transmission line have been transmitted without being discarded during transmission, said received facsimile signals are output to a receiving facsimile terminal; and when a frame detection signal is received which indicates that said facsimile signals were discarded during transmission, end of line codes of said received facsimile signals are detected, then predetermined line data is inserted between said end of line codes of said received facsimile signals, and said facsimile signals with said line data inserted between their end of line codes are output to said receiving facsimile terminal.

22. A facsimile signal transmitting method as recited in claim 21, characterized in that fill data is inserted as said predetermined line data.

23. A facsimile signal transmitting method as recited in claim 21, characterized in that white line data is inserted as said predetermined line data.

24. A facsimile signal transmitting method -as recited in claim 21, characterized in that a facsimile signal received previously or succeedingly is inserted as said predetermined line data.

* * * * *